Patented June 28, 1938

2,122,089

UNITED STATES PATENT OFFICE 2,122,089

PROCESS FOR THE MANUFACTURE OF ARTIFICIAL RESINS

Werner Conrad, Cologne, Germany, assignor to the firm Herbig: Haarhaus Aktiengesellschaft, Cologne-Bickendorf, Germany No Drawing. Application November 27, 1935, Serial No. 51,965. In Germany November 30, 1934

10 Claims. (Cl. 260—8)

This invention relates to a process for the manufacture of artificial resins.

Various proposals have already been made for the manufacture of artificial resins from polyhydric alcohols, higher unsaturated or saturated fatty acids and polybasic acids or their derivatives.

According to an earlier process the acid of a drying oil or the oil itself is added to the mixture of glycerine and phthalic anhydride during the condensation process, which takes place in the presence of sulphuric acid.

In another publication it has been proposed to employ the phthalic anhydride prior to the resin formation for the solution of the drying oil and then to carry out the condensation with glycerine.

A third process consists in that the oil and the ester from poly-basic acid and polyhydric alcohol are boiled in a high boiling solvent whereby the oil becomes distributed in the resin.

Then it has been proposed initially to esterify the glycerine only partly with phthalic anhydride and then to carry out an esterification of the still free hydroxyl groups with a mono-basic acid.

A further proposal consists in converting glycerine or other polyhydric alcohols with monobasic acids into esters still containing free hydroxyl groups, which in a second stage are substituted with polybasic acids such as phthalic acid.

In accordance with a recent proposal monoesters which are prepared from at least trihydric polyhydric alcohols and conjugated unsaturated higher fatty acids are only treated with such quantities of a polybasic acid or its anhydride that only a second hydroxyl group of the glycerine residue for example is substituted so that the third hydroxyl group still present remains available for etherlike condensations.

All known processes depend in principle upon a linking of the individual alcohol molecules by esterification with the carboxyl groups of the polybasic acids, the introduction of the fatty acid components, which impart to the resin drying energy, cohesion, elasticity and resistance to weather, taking place either before, during or after the condensation process between the polyhydric alcohol and the polybasic acid.

In accordance with the present invention new artificial resins which are particularly suited on account of their valuable properties for application as a basis for lacquers, as impregnating, filling and sizing agents and also for molded articles, are produced from polyhydric alcohols and unsaturated and/or saturated higher fatty acids and also polybasic acids or their derivatives. The process of the invention consists in that esters from polyhydric alcohols and polybasic acids, which esters still possess free hydroxyl groups, are brought into reaction with esters from polyhydric alcohols and higher fatty acids, which esters also still contain free hydroxyl groups the fatty acid esters employed preferably having an acid number of about 2, and the polybasic acid esters employed preferably an acid number of about 20. The etherification may take place in accordance with the following scheme of formulae:—

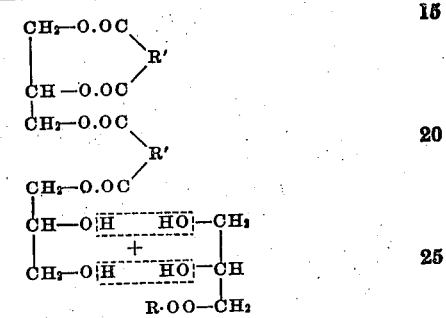

R indicates fatty acid residue.
R' residue of a di-basic acid.

The reaction takes place exclusively between the free hydroxyl groups of incompletely esterified polyhydric alcohols. In an astonishing manner the linking of the components has therefore been successfully effected by etherification only.

The importance of this reaction for the manufacture of artificial resins from polyhydric alcohols, higher monobasic fatty acids and polybasic acids or their derivatives is shown by the following characteristics of the reactions for the combination of the above mentioned constituents.

The introduction of a fatty acid into an already produced condensation product does not allow of the production of uniform products; the proposed application for this type of process of high boiling solvents renders the end products useless for many purposes. The application of an agent promoting the condensation, such as sulphuric acid, renders the resins produced unsuitable for use in coating materials owing to the discoloration occurring.

The hitherto known processes for the linking of an ester from a polyhydric alcohol and a higher unsaturated fatty acid with a polybasic acid have the great disadvantage that for the condensation a long boiling process is necessary which injuriously influences the colour of the products obtained. The long boiling process is, however, unavoidable in order to obtain at all uniform, neutral, utilizable products. On the other hand, it is discovered that in the manufacture of a condensation product from a polyhydric alcohol, for example of "Glyptal", from glycerine and phthalic anhydride, even in a long boiling process the quality of the resin is in no way injured and products can be produced in which practically no free carboxyl groups are still present.

The etherification of the free hydroxyl groups still contained in such products with the hydroxyl groups of an ester of a polyhydric alcohol and a fatty acid takes place extraordinarily rapidly at elevated temperature. Since, as is known, the manufacture of the esters of the latter type offers no difficulties, the new process allows of the manufacture of light coloured artificial resins of completely neutral nature, which is shown for example by the fact that the new products can be worked up with basic pigments such as zinc white without thickening.

The new process offers the further possibility of the production of artificial resins in which, according to the requirements which the resin is intended to fulfil, the individual constituents can be varied in quantity to a far-reaching extent. Thus for example both a mono-acid ester and also a di-acid ester of a polyhydric alcohol can be etherified with a condensation product from a polybasic acid and a polyhydric alcohol. As regards the constituents of the components of the condensation product, for example Glyptal, care need only be taken that over and above the hydroxyl groups necessary for complete saturation of the carboxyl groups further hydroxyl groups remain free for etherification. Within these limits the individual constituents can be varied corresponding to practical requirements. Obviously it is not necessary that in the two esters to be etherified equivalent quantities of unesterified hydroxyl groups should always be present; in the one or in the other constituent hydroxyl groups can be in excess, being then free for further etherification. In addition it is possible to add during or after the ether formation drying and/or non-drying oils.

The properties of the artificial resins produced according to the new process can be improved to a far-reaching extent by subsequent treatment with air or sulphur or by another known process for coating materials. They can likewise be mixed with natural resins such as colophony, copal or their esters or artificial resins, such as phenol-formaldehyde condensation products, formaldehyde-urea condensation products or vinyl resins, pigments, filling materials and the like.

It has already been proposed to convert glycerine and resins first into mono- or di-glycerides, which are then converted among themselves into ether-like complexes by subsequent condensation. The present invention is fundamentally distinguished therefrom in that no etherification between similar esters takes place but, for example, of glycerine-mono-oleic acid ester with, for example, glycerine di-succinic acid ester. The small addition of phthalic acid provided in the known process has only the importance of a homogenizing agent which in addition is intended to accelerate the etherification, whereby however the dibasic acid is esterified with the glycerine mono-acid ester, which does not take place in the present case.

The following examples illustrate the invention.

Example 1

Two mols of glycerine and 2 mols of phthalic anhydride are esterified at 190° C. to an acid number of 20. This ester, which still contains 2 free hydroxyl groups, is etherified with 1 mol. of a mono-ester which has been produced in the known manner by alcoholysis of one mol. of linseed oil with two mols of glycerine at about 275° C. For etherification the temperature of the mixture is increased to about 290° C. By this means with foaming the etherification sets in after a short time and the reaction product becomes clear. The resin produced is, in the cold, hard and very light coloured. It has the acid number 4 and is easily soluble in aromatic hydrocarbons, alcohols and the nitrocellulose solvents. It is compatible with basic pigments and after treatment with drying substances dries in 8 hours. It is furthermore suitable for oven drying.

Example 2

Three mols of glycerine and two mols of phthalic anhydride are esterified at 190° C. as in Example 1 and etherified with three mols of a di-ester which has been produced in the known manner by alcoholysis of two mols of rape oil with one mol. of glycerine at 275° C. For etherification the mixture is heated to about 290° C. for half an hour, if desired until the foaming is complete. The very light resin produced is viscous and is soluble in aliphatic and/or aromatic hydrocarbons, alcohols, esters and ethers. It has the acid number 2 and is compatible with basic pigments. It is excellently suited as resin constituent in nitrocellulose lacquers.

Example 3

One mol. of glycerine and one mol. of octodecadiene carboxylic acid are esterified at about 275° C. to an acid number 1. Two mols of glycerine and two mols of phthalic anhydride are esterified at 190° C. to an acid number of about 20, in a separate batch. The two esters are now etherified at about 290° C. The resin is similar in its properties to that obtained in Example 1.

Example 4

One mol. of erythrite is esterified with two mols of tall oil distillate up to an acid number 2 and etherified with an ester from two mols of methyladipic acid and two mols of glycerine. The temperature is maintained at 220° C. until the etherification is complete. The resin is suitable for the manufacture of molded articles and impregnating agents.

The tall oil distillate employed according to the present example has the following composition and properties:—

| | | | |
|---|---|---|---|
| Acid number | 181.8 | Saponification number | 190.3 |
| Iodine number | 115.0 | Specific gravity 0.920 at | 20° |
| Moisture content | 3.7% | Unsaponifiable | 6.3% |
| Resin acids | 32.2% | Fatty acids | 61.5% |
| Total acids | 93.7% | Ash | 0% |

Example 5

Two mols of glycerine are esterified with two mols of phthalic anhydride at 190° C. to an acid number of about 20. One mol. of mono-ester from two mols of glycerine and one mol. of linseed oil stand oil is then added. There is further added one third mol. of linseed oil and the three components are heated to 290° C. until any turbidity has disappeared. The resin produced is very light coloured and soluble in aliphatic and aromatic hydrocarbons, alcohols, esters, ethers and drying and/or non-drying oils.

*Example 6*

One mol. of glycerine and one mol. of stearic acid are esterified at about 275° C. to an acid number 1. Two mols of glycerine are esterified with two mols of phthalic anhydride at 190° C. to an acid number of about 20 in a separate batch. The two esters are now etherified at 290° C. The very light resin produced is similar to wax and dissolves in aliphatic and aromatic hydrocarbons, alcohols and esters.

I wish it to be understood that I do not desire to be limited to the exact details of the process described, for obvious chemical equivalents thereof will occur to a person skilled in the art.

I claim:

1. The process of manufacturing artificial resins in which polyhydric alcohols partly esterified with fatty acids selected from the group of saturated and unsaturated higher fatty acids are reacted with polyhydric alcohols partly esterified by a polybasic organic carboxylic acid each of the esterified products being produced with polyhydric alcohol exceeding in substantial amount the molecular equivalent necessary for complete reaction with the carboxyl groups of the acids.

2. The process of manufacturing artificial resins in which polyhydric alcohols partly esterified with a fatty acid selected from the group of saturated and unsaturated higher fatty acids are reacted with polyhydric alcohols partly esterified by a polybasic organic carboxylic acid at elevated temperatures, each of the esterified products being produced with polyhydric alcohol exceeding in substantial amount the molecular equivalent necessary for complete reaction with the carboxyl groups of the acids.

3. The process of manufacturing artificial resins which comprises reacting polyhydric alcohols partly esterified with fatty acids selected from the group of saturated and unsaturated higher fatty acids with polyhydric alcohols partly esterified by a polybasic organic carboxylic acid each of the esterified products being produced with polyhydric alcohol exceeding in substantial amount the molecular equivalent necessary for complete reaction with the carboxyl groups of the acids and then subsequently treating the products with a modifying agent selected from air and sulphur.

4. The process of manufacturing artificial resins which comprises reacting polyhydric alcohols partly esterified with fatty acids selected from the group of saturated and unsaturated higher fatty acids with polyhydric alcohols partly esterified by a polybasic organic carboxylic acid in the presence of a glyceride oil each of the esterified products being produced with polyhydric alcohol exceeding in substantial amount the molecular equivalent necessary for complete reaction with the carboxyl groups of the acids.

5. The process of manufacturing artificial resins which comprises reacting polyhydric alcohols partly esterified with fatty acids selected from the group of saturated and unsaturated higher fatty acids with polyhydric alcohols partly esterified by a polybasic organic carboxylic acid each of the esterified products being produced with polyhydric alcohol exceeding in substantial amount the molecular equivalent necessary for complete reaction with the carboxyl groups of the acids and incorporating a glyceride oil into the ether complex.

6. A composition containing the reaction product of a polyhydric alcohol partly esterified with a fatty acid selected from the group of saturated and unsaturated higher fatty acids, with the polyhydric alcohol partly esterified with a polybasic organic carboxylic acid each of the esterified products being produced with polyhydric alcohol exceeding in substantial amount the molecular equivalent necessary for complete reaction with the carboxyl groups of the acids.

7. A composition containing the reaction complex of a glyceride oil with the reaction product of a polyhydric alcohol partly esterified by a fatty acid selected from the group of saturated and unsaturated higher fatty acids, with a polyhydric alcohol partly esterified by a polybasic organic carboxylic acid each of the esterified products being produced with polyhydric alcohol exceeding in substantial amount the molecular equivalent necessary for complete reaction with the carboxyl groups of the acids.

8. A light colored, substantially neutral resin comprising the reaction product resulting from the reaction of two esters still containing free hydroxyl groups obtained by the esterification of glycerine with linseed oil stand oil and glycerine with phthalic anhydride, respectively each of the esterified products being produced with glycerine exceeding in substantial amount the molecular equivalent necessary for complete reaction with the carboxyl groups of the acids.

9. The process of manufacturing artificial resins in which esters from polyhydric alcohols and fatty acids selected from the group of saturated and unsaturated higher fatty acids are reacted with esters from polyhydric alcohols and polybasic acids each of the esterified products being produced with polyhydric alcohol exceeding in substantial amount the molecular equivalent necessary for complete reaction with the carboxyl groups of the acids, the esters employed being practically neutral and containing at least one free hydroxyl group each.

10. The process of manufacturing artificial resins in which esters from polyhydric alcohols and fatty acids selected from the group of saturated and unsaturated higher fatty acids are heated to a temperature of about 290° C. with esters from polyhydric alcohols and polybasic acids each of the esterified products being produced with polyhydric alcohol exceeding in substantial amount the molecular equivalent necessary for complete reaction with the carboxyl groups of the acids, the esters employed being practically neutral and containing at least one free hydroxyl group each.

WERNER CONRAD.